United States Patent [19]
Henry

[11] 3,738,154
[45] June 12, 1973

[54] METHOD OF MEASURING ENTRAINED GAS IN A LIQUID USING A CONVERGING-DIVERGING NOZZLE

[75] Inventor: Robert E. Henry, Western Springs, Ill.

[73] Assignee: The United States of America as represented by the United States Atomic Energy Commission, Washington, D.C.

[22] Filed: Oct. 20, 1971

[21] Appl. No.: 190,876

[52] U.S. Cl. .................................. 73/19, 73/61 LM
[51] Int. Cl. ............................................ G01n 7/00
[58] Field of Search ......................... 73/61 LM, 19

[56] References Cited
UNITED STATES PATENTS

| | | | |
|---|---|---|---|
| 3,060,722 | 10/1962 | Migdal et al. | 73/19 |
| 3,453,867 | 7/1969 | Webb et al. | 73/19 |

*Primary Examiner*—Richard C. Queisser
*Assistant Examiner*—Joseph W. Roskos
*Attorney*—Roland A. Anderson

[57] ABSTRACT

A choked converging-diverging nozzle is employed in a method of detecting the presence and measuring the volumetric concentration of entrained gas in a liquid. The liquid-gas mixture is accelerated through the nozzle to critical flow condtions and the pressure at the throat of the nozzle is measured. The temperature and pressure of the mixture of the stagnation region are monitored, the throat pressure of the liquid-gas mixture being a function of only the void fraction at any given stagnation temperature and pressure.

The method is employed in safety instrumentation for a liquid-cooled nuclear reactor. The throat pressure is monitored with an increase in the throat pressure indicating an undesirable increase in the concentration of entrained gas in the liquid coolant of the reactor which operates at approximate steady state conditions.

5 Claims, 4 Drawing Figures

SODIUM-ARGON MIXTURE 3,738,154

METHOD OF MEASURING ENTRAINED GAS IN A LIQUID USING A CONVERGING-DIVERGING NOZZLE

CONTRACTUAL ORIGIN OF THE INVENTION

The invention described herein was made in the course of, or under, a contract with the United States Atomic Energy Commission.

BACKGROUND OF THE INVENTION

The present invention relates to the critical flow of a two-phase two-component mixture through a choked converging-diverging nozzle. More particularly the invention concerns a method of detecting the presence and measuring the volumetric concentration of an entrained gas in a liquid. Specifically the method is employed in safety instrumentation on the primary coolant loop of a liquid-cooled nuclear reactor to guard against the buildup of entrained gas in the liquid coolant.

While the behavior of one-phase one-component fluids flowing through pipes and nozzles is well known in the art, flow characteristics of two-phase one-component mixtures are less well known, and the behavior and characteristics of two-phase two-component mixtures have only received limited study and are not well known. The present invention arose from a study of the flow of two-phase two-component mixtures where it was found that at critical flow conditions through a converging-diverging nozzle there is a dependence of the pressure characteristics of the nozzle on the void fraction of the mixture. It has been found that this pressure-void fraction relation could be used in a method to detect and measure gas entrained in a liquid. It was further discovered that this relationship could be used to solve a problem confrinting the development of a liquid-metal-cooled nuclear reactor.

One of the problems currently under study for safety analysis in the liquid metal fast breeder reactors is the coolant behavior during a flow transient at full power. If the transient is sufficiently severe, such as a complete inlet flow blockage or a pump coast-down, the coolant will quickly boil and be expelled from the channel. The coolant expulsion process is greatly dependent on the incipient sodium superheat which is significantly affected by any entrained gases that may be present. To definitely evaluate current experimental research on convective sodium superheat and coolant expulsion during the above-mentioned flow transients, it is necessary to detect and measure the entrained gas content in the liquid-metal coolant.

It is also desirable to detect and measure the entrained gas content in the liquid-metal coolant of an operating liquid metal fast breeder reactor. Because of the solubility characteristics of liquid sodium, some of the cover gas of the reactor can enter into solution in the high-temperature upper plenum region. This gas then exits from solution as the coolant temperature decreases in the heat exchangers. Entrainment can also occur due to carry-under if there is a turbulent-free surface anywhere in the system. The result of either of the above entrainment mechanisms is small gas bubbles within the liquid coolant. The presence of these gas bubbles is undesirable as they can lead to many problems including cavitation and damage to the interior surfaces of the reactor and coolant loops as well as a change in reactivity if bubbles pass through the reactor core. Therefore it is desirable to provide instrumentation in the primary coolant loop to detect the presence of entrained gas and measure its volumetric concentration in order to guard against the possible buildup of entrained gas and the release of a large gas bubble.

It is an object of the present invention to provide a method for detecting the presence and measuring the volumetric concentration of entrained gas in a liquid.

It is a further object that the method be adaptable to detecting the presence and measuring the concentration of entrained gas in a liquid-metal coolant of a liquid-metal-cooled nuclear reactor.

Another object of the present invention is to provide instrumentation for the primary coolant loop of a liquid-cooled-nuclear reactor to monitor the entrained gas content of the liquid coolant in order to guard against the possible buildup of entrained gas and the release of a large gas bubble.

SUMMARY OF THE INVENTION

Figure 1:
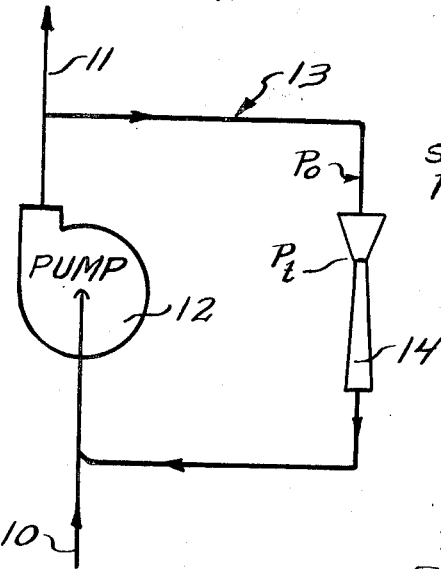
FIG. 1 is a schematic showing the positioning of the converging-diverging nozzle for monitoring the void fraction of a liquid nuclear reactor coolant.

A method of detecting the presence and measuring the volumetric concentration of entrained gas in a liquid employs a choked converging-diverging nozzle. The liquid-gas mixture is accelerated through the nozzle to critical flow conditions and the pressure at the throat of the nozzle is measured. The temperature and pressure of the mixture in the stagnation region are monitored, the throat pressure of the mixture being a function of only the void fraction at any given measured stagnation temperature and pressure.

The method is employed in safety instrumentation on a liquid-cooled-nuclear reactor. The throat pressure is monitored with an increase in the throat pressure indicating an undesirable increase in the average concentration of entrained gas in the liquid coolant of the reactor which operates at approximate steady state conditions.

DESCRIPTION OF THE INVENTION

A study of two-phase critical flow of two-component mixtures in nozzles and short tubes has lead to the discovery that the volumetric concentration of a gas in a liquid can be measured by monitoring the pressure at the throat of a choked converging-diverging nozzle. The fact that the pressure at the throat of a choked converging-diverging nozzle under critical flow conditions is dependent only in the void fraction of the mixture at given stagnation temperature and pressure can be shown mathematically. The study of the critical flow through a nozzle of a two-phase one-component mixture as discussed by Robert E. Henry and Hans K. Fauske in "The Two-Phase Critical Flow of One-Component Mixtures in Nozzles, Orifices, and Short Tubes," *Trans ASME, Journal of Heat Transfer*, 93–C, 179 (1971), is somewhat simplified when considering a two-phase two-component system. This results from the fact that while in the one-component mixture the two phases are interconvertible, in the two-phase two-component mixture the phases are not interconvertible.

The critical flow through a choked converging-diverging nozzle for a two-phase two-component mixture can be expressed as:

$$G_c^2 = - \, x \, (dV_g/dP)_t^{-1} \quad (1)$$

as is apparent from the relationships derived in "A Study of One-and Two-Component, Two-Phase Critical Flows at Low Qualities" by Robert E. Henry, *Argonne National Laboratory Report - ANL*-7430, (*TID*-4500) March, 1968, which is herein incorporated by reference, in which equation and the following mathematical derivation the nomenclature is as follows:

NOMENCLATURE

G = Flow rate per unit area
P = Pressure
V = Specific volume
U = Velocity
X = Quality, $(G_g/G_g + G_l)$
α = Void fraction
β = Critical pressure ratio, $P_t/P_o$
D = Density
Subscripts
c = critical flow
g = gas
l = liquid
o = stagnation
t = throat It is assumed that there are no thermal or velocity differences within the mixture, the specific volume of the liquid, $V_l$ is constant, the quality, $X$, is constant, and the gas exhibits isothermal behavior.

In dealing with two-phase critical flow of fluids through a pipe or nozzle, the familar Newtonian equation F = Ma can be expressed as $$- \lambda \, (1 - X)V_1 + XV_g] dP = U dU \quad (2)$$

This equation can be integrated between the stagnation region and the throat region of the converging-diverging nozzle.

$$-\int_{P_o}^{P_t}[(1-X)V_1 + XV_g]dP = \int_{U_o}^{U_t} U dU \quad (3)$$

Since the velocity of the mixture is zero in the stagnation region by definition, $U_o = 0$ and $$-\int_{P_o}^{P_t}[(1-X)V_1 + XV_g]dP = U_t^2/2 \quad (4)$$

$$-\int_{P_o}^{P_t}(1-X)V_1 dP - \int_{P_o}^{P_t} XV_g dP = U_t^2/2 \quad (5)$$

The assumed isothermal behavior of the gas implies that $PV_g = C$ where $C$ is a constant and hence $V_g = C/P$.

Since both $X$ and $V_1$ are constant, equation (5) can be rewritten:

$$-(1-X)V_1\int_{P_o}^{P_t}dP - \int_{P_o}^{P_t} XC/P dP = U_t^2/2 \quad (6)$$

$$-(1-X)V_1\int_{P_o}^{P_t}dP - XC\int_{P_o}^{P_t} 1/P dP = U_t^2/2 \quad (7)$$

integration yields $$-(l-X)V_1(P_t - P_o) - XC(\ln P_t - \ln P_o) = U_t^2/2 \quad (8)$$

$$(l-X)V_1(P_o - P_t) - XC \ln (P_t/P_o) = U_t^2/2 \quad (9)$$

Since $C = PV_g$ and this is true at all points including the stagnation region, $C = P_o V_{g_o}$ $$(l-X)V_1(P_o - P_t) - XP_o V_{g_o} \ln (P_t/P_o) = U_t^2/2 \quad (10)$$

The flow rate per unit area at any point is equal to the density of the mixture times the velocity at that point and the density is the reciprocal of the specific volume. Therefore, at the throat:

$$G_t = D_t U_t = (U_t/V_t) = U_t/[(l-X)V_1 + XV_g]_t \text{ and}$$
$$G_t[(l-X)V_1 + XV_g]_t = U_t$$

Therefore, $$(1-X)V_1[P_o - P_t] - XP_o V_{g_o} \ln \frac{P_t}{P_o}$$
$$= \frac{G_t^2[(1-X)V_1 + XV_{g_t}]^2}{2} \quad (11)$$

Since $PV_g = C$, $P_o V_{g_o} = C = P_t V_{g_t}$ and $$V_{g_t} = (P_o V_{g_o}/P_t)$$

$$(1-X)V_1[P_o - P_t] - XP_o V_{g_o} \ln \frac{P_t}{P_o}$$
$$= \frac{G_t^2\left[(1-X)V_1 + X\frac{P_o V_{g_o}}{P_t}\right]^2}{2} \quad (12)$$

Since $PV_g = C$, $V_g dP + P dV_g = 0$ and $$-dV_g/dP = V_g/P.$$

Since $$G_t^2 = -\left[X\frac{dV_g}{dP}\right]_t^{-1}, \; G_t^2 = \frac{P_t}{XV_{g_t}} = \frac{P_t^2}{XP_o V_{g_o}}$$

$\beta = P_t/P_o$, so dividing through equation 12 by $P_o$ and substituting yields:

$$(1-X)V_1(1-\beta) - XV_{g_o} \ln \beta$$

$$= \frac{P_t^2[(1-X)V_1 + XV_{g_o}/\beta]^2}{2XP_oV_{g_o}P_o} \quad (13)$$

Dividing by $XV_{g_o}$ $$\frac{(1-X)V_1(1-\beta)}{XV_{g_o}} - \ln \beta = \frac{\beta^2}{2}\left(\frac{[(1-X)V_1 + XV_{g_o}/\beta]^2}{(XV_{g_o})^2}\right) \quad (14)$$

$$\frac{(1-X)V_1}{XV_{g_o}}(1-\beta) - \ln \beta = \frac{\beta^2}{2}\left(\frac{(1-X)V_1}{XV_{g_o}} + \frac{1}{\beta}\right)^2 \quad (15)$$

Since $$\frac{(1-X)V_1}{XV_{g_o}} = \frac{1-\alpha_0}{\alpha_0}$$

equation (15) can be written $$(1 - \alpha_o/\alpha_o)(1-\beta) - \ln\beta = \beta^2/2\,((1-\alpha_o/\alpha_o) + 1/\beta)^2 \quad (16)$$

and by expanding the last term $(1 - \alpha_o/\alpha_o)(1-\beta) - \ln\beta = \beta^2/2\,(1 - \alpha_o/\alpha_o) + \beta\,(1 - \alpha_o/\alpha_o) + 1/2$ (17)

and $$-\ln\beta = \beta^2/2\,(1 - \alpha_o/\alpha_o)^2 - (1 - \alpha_o/\alpha_o)(1 - 2\beta) + 1/2 \quad (18)$$

From this equation, it can readily be seen that the critical pressure ratio $\beta$ is dependent only on the stagnation void fraction and at a fixed or given stagnation temperature and pressure, the throat pressure of the nozzle is a function only of the stagnation void fraction (volumetric gas concentration).

It is therefore possible to detect the presence of and measure the volumetric concentration of a gas entrained in a liquid by accelerating the liquid-gas mixture through a choked converging-diverging nozzle to critical flow conditions and measuring the critical pressure ratio or the throat pressure of the nozzle at a given stagnation temperature and pressure. The throat pressure and stagnation temperature and pressure can be measured by methods well known in the art.

Figure 3:
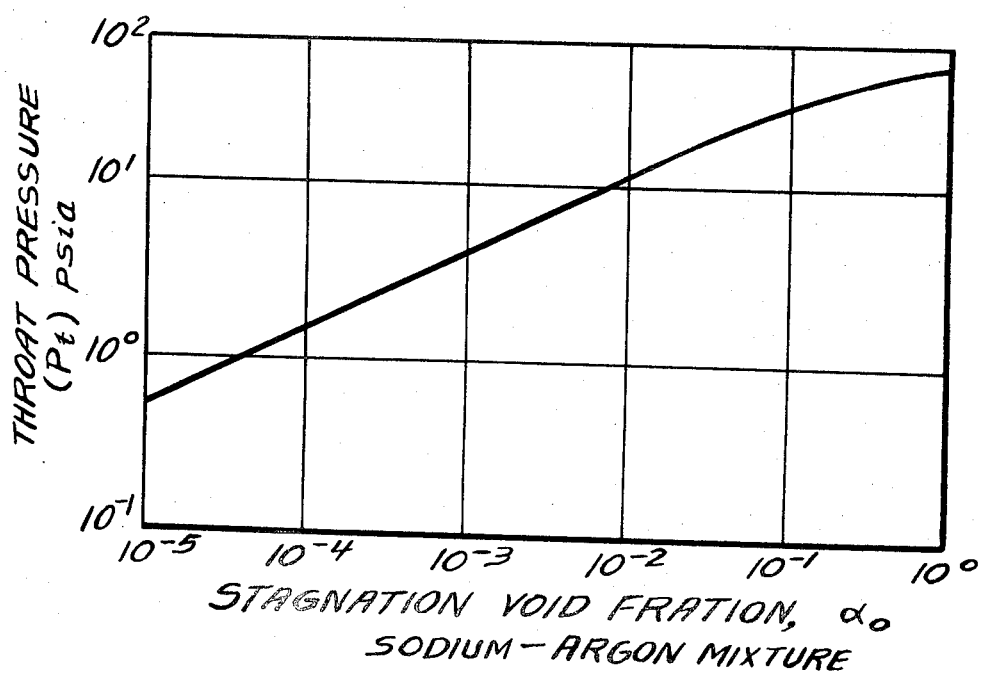
FIG. 3 is a sample graph showing the nozzle throat pressure as a function of the void fraction in the stagnation region for a liquid sodium-argon mixture.

A mathematical model was constructed to predict the relationship between the throat pressure of a converging-diverging nozzle and the void fraction of a liquid sodium-argon mixture. FIG. 3 is a graphic representation of the mathematical prediction for a stagnation pressure of 125 psia and a stagnation temperatue of 700°F. At the fixed stagnation temperature and pressure the throat pressure is only a function of the stagnation void fraction (volumetric gas content) and as can be seen from FIG. 3 this dependency is very sensitive to the void fraction particularly when the void fraction is less than $10^{-1}$. If no entrained gas was present, the throat pressure would be equal to or less than the saturation pressure corresponding to the saturation temperature which is 0.003 psia for the given conditions. It can readily be seen from FIG. 3 that this is considerably less than the two-component throat pressure for $\alpha_o \geq 10^{-5}$. The method is therefore very sensitive to the presence of any entrained gas.

The method can therefore be used to solve the problem of measuring the entrained gas content in liquid-metal coolant in development of liquid-metal reactors. The method can also be used in safety instrumentation on liquid-cooled reactors to detect an undesirable increase in the average concentration of entrained gas in the liquid coolant. Referring to FIG. 1, the liquid coolant emerging from the heat exchanger 10 is pumped into the reactor core 11 by coolant pump 12. A coolant-sampling loop indicated generally at 13 is positioned around the pump 12. A sample portion of the coolant is tapped from the main coolant flow leaving the pump 12, passes through the sampling loop 13, and is accelerated to critical flow conditions in converging-diverging nozzle 14. The sample portion of coolant returns to the main coolant stream from the sampling loop 13 between the heat exchanger 10 and the pump 13. Since the temperature and pressure of the reactor coolant are monitored in normal reactor operation, the throat pressure of the nozzle can be measured to determine the void fraction of the coolant. An absolute measurement of the throat pressure need not be necessary in detecting an increase in the average concentration of entrained gas. Since a reactor will be operating at approximate steady state conditions, the stagnation temperature and pressure will be approximately constant. Therefore, it is only necessary to monitor the throat pressure, an increase in the throat pressure indicating an increase in the average concentration of entrained gas. If the reactor pressure or temperature, and hence the stagnation temperature and pressure, change significantly, this change will be monitored on other reactor indicators and in addition a significant change in the reactor pressure and temperature is indicative of other problems in the reactor which may make gas entrainment inconsequential.

Figure 2:
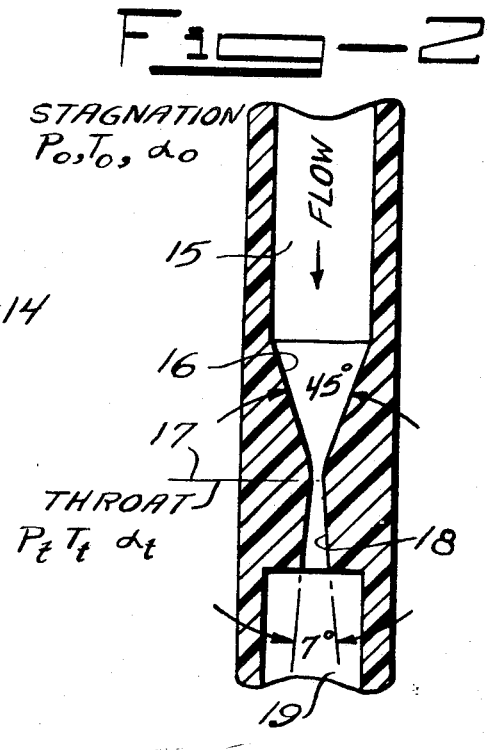
FIG. 2 is sketch of a converging-diverging nozzle used in tests with nitrogen-water mixtures.

The dependency of the critical pressure ratio on only the stagnation void fraction was also shown experimentally in a series of tests using nitrogen-water mixtures. The nitrogen-water mixture was accelerated to critical flow conditions through a lucite converging diverging nozzle such as that shown in FIG. 2. The mixture flowed from the stagnation region 15 to the converging portion of the nozzle 16. The converging portion of the nozzle used in these tests converged at an angle of 45° while the diverging portion of the nozzle 18 diverged at an angle of 7°. The diverging portion of the nozzle 18 led to a length of pipe 19. The pressure of the mixture was measured at the nozzle throat 17. The throat pressure is measured by means well known in the art. Tests were run at three different stagnation pressures, 100 psia, 115 psia, and 140 psia. The results of the tests are shown in the following table and on the graph in FIG. 4.

NITROGEN-WATER TEST DATA

| Run | $P_o$ (psia) | X | $\alpha_o$ | $P_t$ (psia) |
|---|---|---|---|---|
| 1 | 116.0 | 0.00202 | 0.183 | 40.3 |
| 2 | 117.0 | 0.00525 | 0.367 | 50.0 |
| 3 | 114.8 | 0.00293 | 0.247 | 43.2 |
| 4 | 116.0 | 0.00418 | 0.317 | 48.1 |
| 5 | 114.5 | 0.00053 | 0.056 | 22.8 |
| 6 | 114.5 | 0.00042 | 0.045 | 20.0 |
| 7 | 115.0 | 0.00029 | 0.031 | 15.5 |
| 8 | 115.5 | 0.00020 | 0.021 | 12.3 |
| 9 | 115.5 | 0.00013 | 0.014 | 9.3 |
| 10 | 116.0 | 0.000078 | 0.0085 | 6.1 |
| 11 | 99.0 | 0.00061 | 0.072 | 21.8 |
| 12 | 100.5 | 0.00047 | 0.056 | 18.6 |
| 13 | 99.5 | 0.00033 | 0.040 | 14.2 |
| 14 | 100.5 | 0.00020 | 0.024 | 9.9 |
| 15 | 100.0 | 0.00013 | 0.016 | 7.2 |
| 16 | 100.5 | 0.000083 | 0.010 | 5.1 |
| 17 | 114.0 | 0.00054 | 0.056 | 23.1 |
| 18 | 115.0 | 0.00028 | 0.029 | 15.1 |
| 19 | 115.5 | 0.00013 | 0.014 | 9.7 |
| 20 | 100.0 | 0.00016 | 0.019 | 9.9 |
| 21 | 99.5 | 0.00033 | 0.040 | 15.8 |
| 22 | 99.5 | 0.00060 | 0.071 | 23.0 |
| 23 | 114.5 | 0.00333 | 0.269 | 45.2 |
| 24 | 114.0 | 0.01019 | 0.531 | 56.0 |
| 25 | 99.5 | 0.01267 | 0.619 | 51.0 |
| 26 | 99.5 | 0.00419 | 0.348 | 43.5 |
| 27 | 114.5 | 0.00333 | 0.268 | 46.1 |
| 28 | 114.5 | 0.00986 | 0.521 | 56.0 |
| 29 | 99.0 | 0.01238 | 0.613 | 50.2 |
| 30 | 100.0 | 0.00340 | 0.329 | 42.7 |
| 31 | 140.3 | 0.00434 | 0.280 | 57.0 |
| 32 | 139.7 | 0.00279 | 0.201 | 50.5 |
| 33 | 140.2 | 0.00180 | 0.139 | 43.5 |
| 34 | 139.7 | 0.00456 | 0.289 | 57.6 |
| 35 | 140.4 | 0.00293 | 0.206 | 51.2 |
| 36 | 141.0 | 0.00185 | 0.140 | 43.8 |
| 37 | 139.6 | 0.00042 | 0.036 | 18.9 |
| 38 | 140.0 | 0.00022 | 0.019 | 12.4 |
| 39 | 139.8 | 0.00011 | 0.0092 | 8.0 |
| 40 | 140.4 | 0.00043 | 0.037 | 18.7 |
| 41 | 140.2 | 0.00025 | 0.022 | 15.3 |
| 42 | 139.8 | 0.00011 | 0.0096 | 10.1 |

Figure 4:
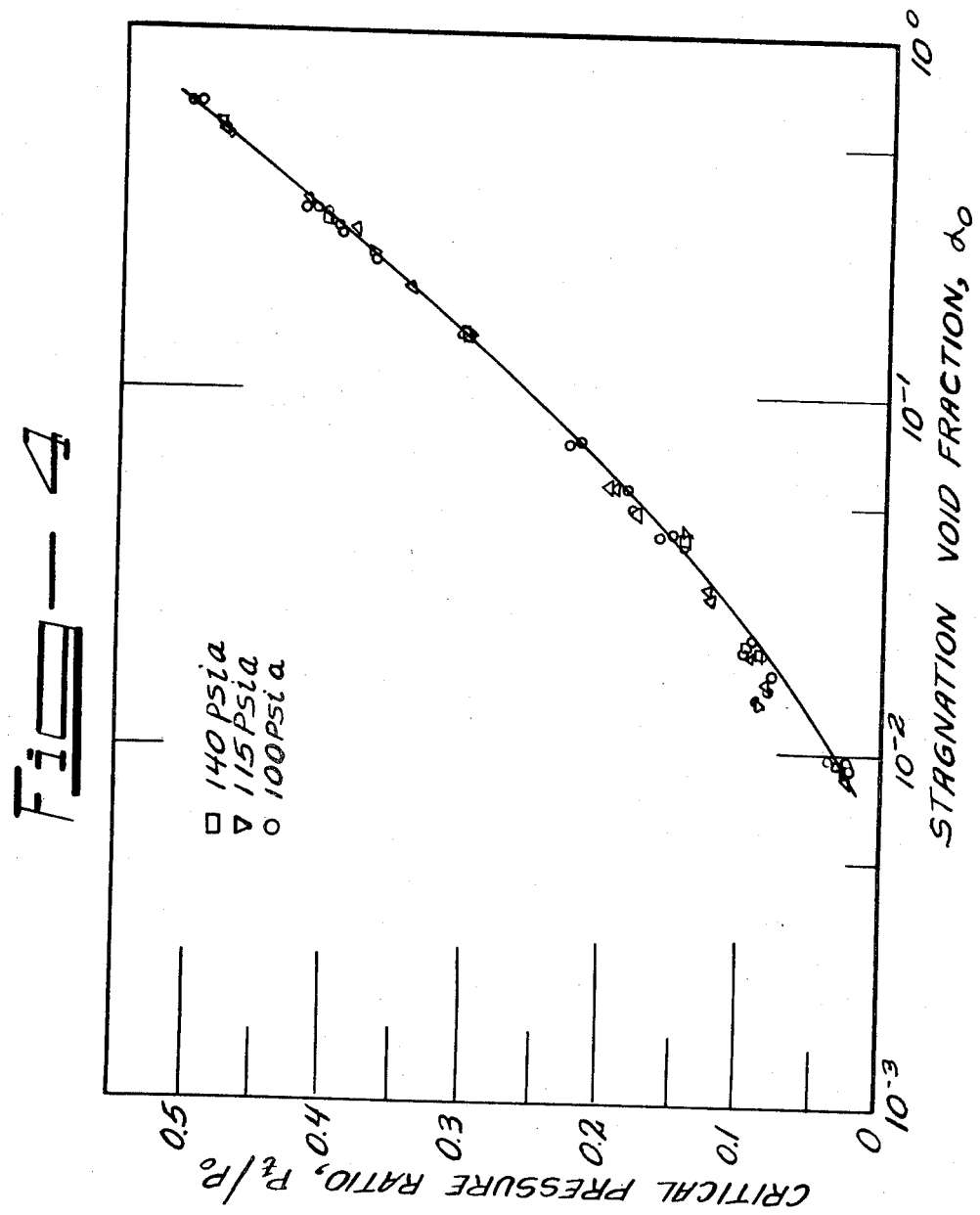
FIG. 4 is a graph demonstrating the relationship between the critical pressure ratio and the stagnation void fraction.

It can be seen from FIG. 4 that the critical pressure ratio is dependent only on the stagnation void fraction. This dependency is true at all three stagnation pressures.

The embodiments of the invention in which an exclusive property or privilege is claimed are defined as follows:

1. A method of detecting the presence and measuring the volumetric concentration of entrained gas in a liquid comprising: accelerating the liquid-gas mixture through a choked converging-diverging nozzle to critical flow conditions; measuring the temperature and pressure in the stagnation region; and measuring the pressure at the throat of the converging-diverging nozzle, the throat pressure of the liquid-gas mixture being a function of only the void fraction at any given stagnation temperature and pressure.

2. The method of detecting the presence of and measuring the volumetric concentration of entrained gas in a liquid in accordance with claim 1 in which the void fraction of the mixture is calculated from the formula $$-\ln\beta = \beta^2/2 \, (1 - \alpha_o/\alpha_o)^2 - (1 - \alpha_o/\alpha_o)(1 - 2\beta) + 1/2$$

wherein $\beta = P_t/P_o$ = the critical pressure ratio,
$P_t$ = the pressure at the throat of the nozzle,
$P_o$ = the pressure in the stagnation region, and
$\alpha_o$ = the stagnation void fraction.

3. The method of detecting the presence of and measuring the volumetric concentration of entrained gas in a liquid in accordance with claim 2 wherein the liquid is the liquid-metal coolant of a liquid-metal-cooled-nuclear reactor.

4. A method of detecting and measuring an increase in the average concentration of entrained gas in the liquid coolant of a nuclear reactor operating under steady state conditions comprising:

a. accelerating a portion of the liquid coolant through a choked converging-diverging nozzle to critical flow conditions; and b. measuring the pressure at the throat of said choked converging-diverging nozzle, an increase in said throat pressure indicating an increase in the average concentration of entrained gas.

5. The method of detecting and measuring an increase in the average concentration of entrained gas of claim 4 wherein said portion of the liquid coolant is taken from the reactor core side of a primary loop coolant pump.

* * * * *